Patented May 10, 1949

2,469,625

UNITED STATES PATENT OFFICE 2,469,625

METHOD OF RENDERING HYDROPHILIC SUBSTANCE WATER REPELLENT

Arthur J. Barry, Midland, Mich., assignor to The Dow Chemical Company, Midland, Mich., a corporation of Delaware No Drawing. Application December 10, 1943, Serial No. 513,745

2 Claims. (Cl. 117—121)

This invention concerns certain new alkoxy-silicon halides having the general formula:

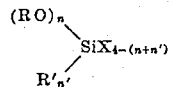

wherein each R represents a hydrocarbon radical and at least one R represents an alkyl radical containing 8 or more carbon atoms, R' represents a monovalent hydrocarbon radical, X represents a halogen, e. g. fluorine, chlorine or bromine, and $n$ and $n'$ are whole numbers having a sum not greater than 3, $n$ being a number from 1 to 3, inclusive, and $n'$ being a number from 0 to 2, inclusive. When in the general formula $n$ is greater than one, the symbols R may represent the same or different radicals; and when $n'$ is greater than one, the symbols R' may represent the same or different radicals. The compounds having said general formula are usually mobile liquids, although they may in some instances be solids. The compounds may readily be reacted with water, hydroxyl compounds, or salts of carboxylic acids, etc., which reactions involve the splitting out of one or more halogen atoms from the molecule, e. g. as a hydrohalic acid or a salt of such acid, with replacement of the halogen by a radical of the compound with which the alkoxy silicon halide is reacted. For instance, such alkoxy silicon halides may be reacted with water to form corresponding alkoxy silicols which often spontaneously undergo an intermolecular condensation reaction to form viscous liquid or solid products of high molecular weight, or they may be reacted with hydroxy compounds, e. g. alcohols, phenols or cellulose, to form corresponding alkoxy silicon esters of such hydroxy compounds. Accordingly, the alkoxy silicon halides are useful as starting materials for the preparation of a variety of useful derivatives thereof.

The alkoxy silicon halides containing an alkoxy radical having at least eight carbon atoms are especially useful as agents for treating hydrophilic substances having hydroxyl groups at or near the surface to render such substances repellent to water, and for this purpose the higher alkoxy silicon halides provided by the invention differ markedly from the lower alkoxy- (e. g. methoxy- to hexoxy-) silicon halides previously known to the art. Such lower alkoxy silicon halides may be applied to hydrophilic materials to form at the surface of the latter a temporary water-repellent film of probably not more than a few molecules thickness, but such water-repellent film is usually short-lived and is readily removed, particularly by washing with soapy water. In contrast the higher alkoxy silicon halides which are provided by the invention, when applied to hydrophilic materials, form at the surface of the latter a nearly invisible water-repellent film which is far more durable and which is not readily removed by washing with water or soapy water. Furthermore when, after extensive use or prolonged washing, the water-repellent film starts to fail, e. g. the hydrophilic base member becomes wetted in spots with water, the film may be reoriented at the surface of the base member merely by drying and washing the material with an organic liquid such as benzene, toluene, chlorobenzene, carbon tetrachloride, ethylene chloride, or propylene chloride, etc., so as again to render the surface of the material uniformly repellent to water.

In view of these facts it appears that the alkoxy silicon halides react with hydroxy groups at the surface of hydrophilic base members to split out hydrogen halide and form a chemical bond, e. g. an ester linkage, with the surface of the base member. It also appears that the stability of the chemical bond, e. g. its resistance to cleavage by hydrolysis, varies depending on the size of the alkoxy group or groups attached to the silicon atom and the bond to the base member becomes more resistant to cleavage with increase in the number of carbon atoms in an alkoxy group connected with the silicon atom. However, the invention is not restricted to this theory as to the reason for the results obtained. The observed fact is that alkoxy silicon halides which contain an alkoxy radical having at least eight carbon atoms forms, when applied to a hydrophilic substance, a water-repellent film which is far more permanent than that formed by treating the hydrophilic substance with an alkoxy silicon halide wherein the alkoxy groups each contain a lesser number of carbon atoms, e. g. 6 or less.

The alkoxy silicon halides of this invention are preferably prepared by reacting an aliphatic alcohol, having at least eight carbon atoms in the molecule, with a polyhalo-silicon compound having the general formula:

wherein R' represents a hydrocarbon or a hydrocarbonoxy radical, X is a halogen, and $n$ is a whole number of value ranging from 0 to 2, inclusive. Examples of such alcohol reactants are the primary and secondary octyl alcohols, primary and secondary nonyl alcohols, decyl alcohol, dodecyl alcohol, tetradecyl alcohol, cetyl alcohol, carnaubyl alcohol, ceryl alcohol, myricyl alcohol and tarchonyl alcohol, etc. Examples of polyhalo-silicon compounds having the above general formula are silicon tetrachloride, silicon tetrabromide, silicon tetrafluoride, methyl silicon trichloride, methyl silicon trifluoride, ethyl silicon tribromide, butyl silicon trichloride, octyl silicon trichloride, di-octyl silicon dichloride, dodecyl silicon trichloride, di-dodecyl silicon dichloride, phenyl silicon trichloride, diethoxy silicon dichloride, tolyloxy silicon trichloride and di-phenoxy silicon dichloride, etc.

The reaction between an alcohol and such polyhalo-silicon compound occurs readily and rapidly even at low temperatures and care is taken to prevent the reaction from taking place violently. Usually the polyhalo-silicon compound is dissolved in an equal volume or more of an inert organic solvent, e. g. petroleum ether, ligroin, benzene, or ethylene chloride, etc., and the solution is cooled to below room temperature. The alcohol reactant is then added in amount chemically equivalent to the halogen atoms to be displaced from the polyhalo-silicon compound used as a starting material. For instance, in the reaction of decyl alcohol with silicon tetrachloride, when monodecoxy silicon trichloride is to be produced, the reactants are used in approximately equimolecular quantities, but when di-decoxy silicon dichloride is desired as the product, two molecular equivalents of the alcohol is used per mole of the silicon tetrachloride. If desired, a trihalo-silicon compound or a silicon tetrahalide may be reacted with two or more different alcohols, e. g. with octyl and dodecyl alcohols, to form a polyalkoxy silicon halide such as octyl dodecyl silicon dichloride. Such reactions of a polyhalo-silicon compound with different alcohols are preferably carried out in successive manner, since a good yield of a single polyalkoxy silicon halide may be obtained when this is done, but the reactions of a polyhalo silicon compound with two or more different alcohols may be carried out simultaneously if desired.

The reaction of an alcohol with a polyhalo silicon compound is exothermic and results in the evolution of a gaseous hydrogen halide. During the early stages of the reaction, the mixture is usually cooled, e. g. to maintain it at room temperature or below, but when the reaction has subsided or become less vigorous, the mixture may be heated under reflux to assure completion of the reaction. There are, of course, other ways in which the rate of the reaction may be controlled, e. g. the alcohol reactant may be added gradually to the polyhalo silicon compound while maintaining the resultant mixture at above room temperature. When the reaction is complete (as evidenced by the fact that hydrogen halide is no longer evolved) the mixture is fractionally distilled to separate the alkoxy silicon halide product.

Any of a wide variety of materials which normally are hydrophilic may be rendered hydrophobic by treatment with the alkoxy silicon halide products. Examples of such hydrophilic materials are metals such as iron, aluminum, or magnesium; cellulosic materials such as cotton, rayon, or cellulose esters and ethers in general; and various other materials such as glass, leather, wool, or rubber, etc. In treating cellulosic substances such as cotton, cellulose acetate, or ethyl cellulose, with the alkoxy silicon halides, considerable care must be exercised in order to avoid weakening or other damage to the material by the hydrogen halide which is formed during the treatment. The treatment of such materials is preferably carried out at a moderate temperature, e. g. between room temperature and 100° C., while applying a vacuum or other conditions such as to remove the hydrogen halide as it is formed. Because of the inconveniences involved in observing such precautions during the treatment of organic substances, the alkoxy silicon halides are best adapted for the treatment of woolen goods, or of hydrophilic inorganic substances, e. g. metals or glass, to render their surfaces repellent to water.

The alkoxy silicon halides may be applied in concentrated form or as a solution in an organic diluent such as benzene, toluene, or carbon tetrachloride, etc., to the hydrophilic base material by dipping, brushing, or spraying, or in other usual ways. In the instances in which the alkoxy silicon halides are sufficiently volatile to form a vapor of the same, the treatment may be accomplished by contacting the hydrophilic material with such vapor. During contact of the alkoxy silicon halide with the hydrophilic, i. e. water-wettable, base material, the latter is advantageously heated to a temperature at which a hydrogen halide is evolved. The treated material is thereafter washed with an organic solvent to remove unadsorbed alkoxy silicon halide from its surface. Alternatively, the treated material may be washed with water or treated with steam to hydrolyze such unadsorbed alkoxy silicon halide and to remove the hydrohalic acid formed in the hydrolysis.

By such treatment the surfaces of iron, steel, or other metals may be rendered water-repellent and, therefore, resistant to rusting or other corrosive action such as is caused in part by moisture. Also, the surfaces of metals, glass, or ceramic ware, etc., may be provided with a water-repellent film which is adsorptive to organic liquids and to which paints, lacquers, varnishes, and the like adhere more firmly than to the hydrophilic base material itself. Accordingly, the foregoing treatment of inorganic hydrophilic base materials with the higher alkoxy silicon halides provided by the invention is an excellent pretreatment preparatory to applying organic coatings, e. g. paint or lacquer, to such base materials.

The following examples describe a number of ways in which the principle of the invention has been applied, but are not to be construed as limiting the invention.

EXAMPLE 1

In each of a series of experiments an alkoxy silicon halide was prepared by cooling a solution of a polyhalosilicon compound, named in the following table, and about 3.5 times its weight of petroleum ether to about 0–5° C. in an ice bath and gradually adding the alcohol also named in the table. Thereafter the mixture was heated under reflux in order to assure completion of the reaction and to vaporize therefrom the hydrogen halide formed in the reaction. Heating was continued until hydrogen halide was no longer evolved. The petroleum ether was then distilled from the product. In some, though not all, instances the residual product was purified by fractional distillation. The table names the reactants employed and gives the relative proportions of the same. It also names and describes the alkoxy silicon halide products. In those instances in which the foregoing general procedure was modified in any important respect, the modification of the procedure is mentioned in the table.

Table

| Run No. | Reactants | | | | Product | | Comments |
|---|---|---|---|---|---|---|---|
| | Polyhalo-Silicon Compound | | Alcohol | | Name | Properties | |
| | Kind | Moles | Kind | Moles | | | |
| 1 | SiCl₄ | 1 | Octanol-2 | 3 | Tri-octyloxy silicon chloride. | A mobile liquid of lemon color. | Product was not distilled. It probably includes minor amounts of di-octyloxy silicon dichloride and octyloxy silicon trichloride. |
| 2 | Dodecyl silicon trichloride. | 1 | Iso-octyl alcohol | 2 | Dodecyl-di-iso-octyloxy silicon chloride. | A liquid of pale yellow color. | Product was not distilled. |
| 3 | SiCl₄ | 1 | Lauryl | 1 | Dodecoxy-silicon trichloride. | Colorless liquid of B. P. 103–110° C./5 mm. | Product was purified by distillation. |
| 4 | do | 1 | do | 2 | Di-dodecoxy silicon dichloride. | A colorless liquid distilling at 210–222° C./0.5 mm. | Product was purified by distillation. |
| 5 | do | 1 | do | 3 | Tri-dodecoxy silicon chloride. | A liquid of light tan color having approximately the M. P. 9° C. | Product was not distilled. |
| 6 | Di-phenyl-silicon dichloride. | 1 | do | 1 | Dodecoxy-di-phenyl silicon chloride. | A liquid of pale tan color. | Product was not distilled. |
| 7 | Isoamyl silicon trichloride. | 1 | do | 2 | Di-dodecoxy-isoamyl silicon chloride. | A liquid of lemon color. | Product not distilled. |
| 8 | SiCl₄ | 1 | n-Propyl / Octadecyl | 1 / 2 | Di-octadecoxy propoxy silicon chloride. | Obtained as a pale yellow solution in hydrocarbon solvents. | The octa-decyl alcohol did not dissolve satisfactorily until the reaction mixture was heated. Product was not isolated but was used while in solution for the preparation of derivatives. |
| 9 | do | 1 | n-Propyl / Lauryl / Octadecyl | 1 / 1 / 1 | Octadecoxy-dodecoxy-propoxy-silicon chloride. | A liquid of tan color. | The SiCl₄ was reacted with a mixture of the alcohols. The product was not distilled. |

In addition to the foregoing compounds I have also prepared tri-myricyloxy silicon chloride by the reaction of myricyl alcohol with silicon tetrachloride. In this instance, the product was obtained as a solution in the solvent used as the reaction medium and was not isolated. Instead it was employed as a reagent for the preparation of other compounds while in said solution and was not isolated. Still other higher alkoxy silicon halides may similarly be prepared. For instance, tridodecyloxy silicon bromide may be prepared by reacting dodecyl alcohol with silicon tetrabromide, or di-octyloxy silicon difluoride may be prepared by reacting octyl alcohol with silicon tetrafluoride, etc.

EXAMPLE 2

Three pieces of cotton broadcloth having a count of 80 x 160 threads per inch were immersed in a solution containing 3 per cent by weight of tri-lauryloxy silicon monochloride dissolved in a dry-cleaning liquid consisting essentially of a mixture of ethylene chloride and propylene chloride. The cloth was then air-dried until the dry-cleaning fluid had evaporated, after which it was washed with soapy water, rinsed and dried. It was then pressed with a flatiron heated to about 250° C., dry-cleaned and again ironed. One piece of the cloth, thus treated, was tested for water-repellency in accordance with the "hydrostatic" method described by Slowinske in Am. Dyestuff Reporter, 30, 7 (1941). It was found to withstand a hydrostatic pressure of 17 centimeters before penetration of water through the fabric occurred. A second piece of the cloth which had been treated with the tri-lauryloxy silicon chloride was subjected to the standard soap and water washing operation described on page 170 of the AATCC book of "Standard Test Methods." It was then dried and tested for water-repellency by the "hydrostatic" method. It also withstood a hydrostatic pressure of 17 centimeters before leakage occurred. The third piece of cloth which had been treated with tri-lauryloxy silicon chloride and ironed was subjected to dry-cleaning in a liquid mixture of ethylene chloride and propylene chloride, pressed with a hot iron until free of the cleaning fluid and then tested for water-repellency. It withstood a hydrostatic pressure of 15 centimeters before being penetrated by the water. The operations carried out with the cloth piece last mentioned show that the water-repellency was not reduced to any great extent by treatment with the dry-cleaning fluid (which is an excellent solvent for tri-lauryloxy silicon chloride) and indicates that the tri-lauryloxy-silicon radical has become chemically combined with the fabric. The pieces of cloth subjected to each of the foregoing treatments were well suited for use as water repellent fabrics.

EXAMPLE 3

In two series of experiments, separate samples of a magnesium alloy, containing approximately 6 per cent by weight of aluminum, 3 per cent of zinc, 0.2 per cent of manganese and the remainder magnesium, were treated and thereafter tested for corrosion by salt water as follows: In one series of tests, samples of the alloy were "chrome-pickled" as described in Treatment No. 1 on page 63 of the book "Dowmetal Magnesium Alloys," published by The Dow Chemical Company of Midland, Michigan, in 1943. One of the chrome-pickled samples was tested directly for corrosion as described below. Another sample was dipped into a one per cent by weight solution of di-octyloxy dodecyl silicon chloride in toluene and then removed from the solution and heated at 150° C. for one hour. It was then tested for corrosion. In the other series of experiments, samples of the same alloy which had been "dichromate-coated" by the method described in Treatment No. 7 on page 65 of the above-mentioned book, were employed. One sample of the dichromate-coated alloy was tested directly for corrosion by salt water and another sample was dipped in the one per cent solution of di-octyloxy dodecyl silicon chloride, then heated at 150° C. for one hour and thereafter tested for corrosion. Each corrosion test was carried out by immersing a test piece in an aqueous sodium chloride solution of 3 per cent concentration, removing the test piece and permitting the liquor to drain therefrom and again immersing it in the brine, etc. These operations were carried out at room temperature and in regular cycles over a period of two weeks. All of the test pieces were initially of the same dimensions. After completing the tests, each test piece was examined to determine the extent by which it had been corroded. The following table identifies each test piece by stating whether it was "chrome-pickled" or was "dichromate coated" and by stating whether it was treated with the di-octyloxy dodecyl silicon chloride. The table states the portion of the metal surface which had suffered corrosion as per cent of the total surface of the test piece.

Table

| Run No. | Test Piece | Treated With Di-Octyloxy Dodecyl Silicon Chloride | Per Cent Corrosion |
|---|---|---|---|
| 1 | Chrome-pickled | No | 80 |
| 2 | do | Yes | 10 |
| 3 | Dichromate Coated | No | 55 |
| 4 | do | Yes | 3 |

Other modes of applying the principle of the invention may be employed instead of those explained, change being made as regards the method and materials herein disclosed, provided the steps or compounds stated by any of the following claims or the equivalent of such steps or compounds be employed.

I therefore particularly point out and distinctly claim as my invention:

1. The method which comprises applying to the surface of a water-wettable solid material an organo silicon compound having the general formula:

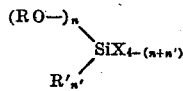

wherein each R represents a hydrocarbon radical and at least one R is an alkyl radical containing at least 8 carbon atoms, R' represents a monovalent hydrocarbon radical, X is a halogen, and $n$ and $n'$ are whole numbers having a sum not greater than 3, $n$ being a number from 1 to 3 and $n'$ being a number from 0 to 2, and heating the treated solid material to a temperature at which a hydrogen halide is evolved, whereby the surface of the solid material is modified and rendered repellent to water.

2. The method which comprises applying to the surface of a water-wettable solid material a liquid comprising an organo-silicon compound having the general formula:

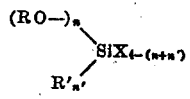

wherein each R represents a hydrocarbon radical and at least one R is an alkyl radical containing at least 8 carbon atoms, R' represents a monovalent hydrocarbon radical, X is a halogen, and $n$ and $n'$ are whole numbers having a sum not greater than 3, $n$ being a number from 1 to 3 and $n'$ being a number from 0 to 2, heating the treated solid material to a temperature at which a hydrogen halide is evolved, and thereafter washing the treated surface of the solid material with an organic solvent for the organosilicon compound, to remove the unadsorbed excess of said compound.

ARTHUR J. BARRY.

REFERENCES CITED

The following references are of record in the file of this patent:

UNITED STATES PATENTS

| Number | Name | Date |
|---|---|---|
| 1,450,467 | Weyland | Apr. 3, 1923 |
| 1,561,988 | Laurie | Nov. 17, 1925 |
| 2,053,474 | Graves | Sept. 8, 1936 |
| 2,242,400 | Loane | May 20, 1941 |
| 2,306,222 | Patnode | Dec. 22, 1942 |
| 2,390,370 | Hyde | Dec. 4, 1945 |
| 2,438,736 | Barry | Mar. 30, 1948 |

FOREIGN PATENTS

| Number | Country | Date |
|---|---|---|
| 625,077 | Germany | May 24, 1938 |
| 116,470 | Australia | Feb. 4, 1943 |

OTHER REFERENCES

King-Journal Oil Colour Chemists Asso., vol. 13, No. 116, Feb. 1930.

Signer, "Annalen der Chemie," vol. 488, pgs. 65–6 (1931).

Uchida, "Chemical Abstracts," vol. 27, pg. 3464 (1933).

Yudin, Comtes Rendus, vol. XXV, No. 7, pgs. 614–617 (1939).

Volnov, "Chemical Abstracts," vol. 34, pgs. 5048–5049 (1940).

Kalinin, "Chemical Abstracts," vol. 35, pg. 2470 (1941).